United States Patent [19]

Reitz

[11] 4,425,234

[45] Jan. 10, 1984

[54] HOLLOW FIBER SEPARATORY DEVICE

[75] Inventor: Carl W. Reitz, Riehen, Switzerland

[73] Assignee: Hospal Ltd., Basel, Switzerland

[21] Appl. No.: 61,998

[22] Filed: Jul. 30, 1979

[51] Int. Cl.³ .............................................. B01D 31/00
[52] U.S. Cl. .................................. 210/321.3; 210/450; 210/456; 264/258
[58] Field of Search .................. 210/22, 321, 450, 456, 210/321.1, 321.2, 321.3; 264/258; 156/180; 422/48

[56] References Cited

U.S. PATENT DOCUMENTS 3,704,223 11/1972 Dietzsca et al. ................ 210/321 B
3,746,175 7/1973 Markley .......................... 210/321 B
4,038,191 7/1977 Davis et al. ..................... 210/456 X

Primary Examiner—Frank A. Spear, Jr.
Attorney, Agent, or Firm—Gerald D. Sharkin; Robert S. Honor; Walter F. Jewell

[57] ABSTRACT

The invention concerns a hollow fibre separatory device. The opened ends of the hollow fibres are situated in a plane which is at an acute angle relative to the axes of end sections of the fibres. A reservoir is provided which defines a fluid flow passage leading across the open ends of the fibres from a region adjacent the acute angle at the periphery of the plane to the opposing peripheral region. Fibre end openings are signficantly larger than the normal open cross-sectional area.

Also disclosed are processes for producing the hollow fibre separatory devices. Including in particular a novel procedure for introducing solidifiable sealing material at an acute angle relative to the ends of hollow fibres.

39 Claims, 13 Drawing Figures

HOLLOW FIBER SEPARATORY DEVICE

This invention relates to a hollow fibre separatory device. Particularly, the invention is concerned with factors related to the passage of fluid into hollow fibres comprised in a hollow fibre separatory device.

BACKGROUND OF THE INVENTION

In the construction of a hollow fibre separatory device a large number of factors need to be considered, the complexity of which varies dependently of the nature of the fluid to be treated, and the size of the bores of the hollow fibres. For example, if the fluid to be treated is blood, which in conventional devices is normally passed through the insides of a multitude of very fine hollow fibres, care needs to be taken to avoid so-called regions of stasis which can lead to clotting and blocking of a significant number of hollow fibres. An approach to this difficulty is to construct the device in such a fashion that turbulence will prevail in the blood immediatly prior to entry into hollow fibre openings. In known devices, a reservoir of relatively small volume is defined between an end casing section and the face of a sealing material at which face hollow fibres define open ends. Such hollow fibre devices function with varying efficiency and all require that blood be heparinized to reduce the inclination for blood to clot in the hollow fibre device.

It is an object of the present invention to provide an improved hollow fibre separatory device in which fluid to be treated, and in particular blood, will be subjected to less changes or less abrupt changes of its dynamic state in its progress from a fluid supply line, into the said reservoir and into hollow fibres. Stated in another fashion, this object of the invention is concerned with reducing the abruptness of acceleration which fluid particles are subjected to in their progress from the reservoir into hollow fibres. Related to this object is the further object to reduce potential regions of a form of stasis which can occur at regions which are irregular as related to fluid flow directions.

A further and independent object of the present invention is concerned with facilitating passage of fluid into (or out of) the insides of hollow fibres.

Yet a further object of the invention is related to a construction in which the potential of stagnant regions developing in the reservoir is reduced. More particularly, a construction of the invention includes the consideration of endeavouring to maintain fluid flow across all faces to which it is exposed at substantially similar rates.

SUMMARY OF THE INVENTION

In accordance with invention, there is provided a hollow fibre separatory device, comprising a plurality of hollow fibres having end openings defined at ends of the hollow fibres, which end openings are larger than the open cross-sectional area defined by the fibres inwardly of said ends in a plane normal to the axis of the fibres. By the word "normal", vertical to a two-dimensional plane is intended. Although in the present description, particularly as related to the description with reference to the accompanying drawings, only one means for establishing end openings which are larger than the normal open cross-sectional area of the fibres is described, a variety of other means are possible. For example, rendering a section of fibre plastic by the action of heat or of a solvent and applying a differential pressure across the fibre wall could lead to suitable increase of open cross-sectional areas and hence end openings could be established which are larger than the normal open cross-sectional area of the fibres. However, in view of the exceptional simplicity of the means of the invention disclosed in detail below for achieving enlarged end openings, this is much preferred. Furthermore, the means disclosed in detail below, can, amongst other procedures, employ relatively simple modification of procedures widely employed in constructing hollow fibre separatory devices. Furthermore still, the means disclosed in more detail below lends itself to simultaneous achievment of certain objectives of the invention mentioned above.

The end openings may be from 1.1 to 6 times larger than said open cross-sectional area, but are preferably from 1.5 to 3 times larger. Most preferred, in view of practical considerations, the end openings are about twice as large as the open cross-sectional area defined by the fibres inwardly of the ends in a plane normal to the axis of the fibres. More particularly, in accordance with the invention, the end openings are elliptical. The elliptical end openings would most conveniently be defined by ends of hollow fibres in a plane which is at an acute angle relative to the axis of hollow fibre end sections having the end openings.

Reference is made to end sections of the hollow fibres to accommodate possible constructions of hollow fibre devices in which the fibres are bent or twisted. It will be understood that all that is necessary is that the fibre end opening in this embodiment be larger than the normal open cross-sectional area of the fibre by being defined in a plane which is at an acute angle relative to the axis of the fibre end. Note is here made that an obtuse angle can equally well be referred to in place of an acute angle.

An enlargement of end openings of hollow fibres can, in addition to advantages already suggested, enable use of fibres which are of still smaller open cross-section than presently employed. For example, in hollow fibre separatory devices adapted for treatment of blood, in which blood is passed through the insides of fibres, practical difficulties, such as priming the device with saline solution, arise if the fibres are much smaller than about 200 $\mu$m inside diameter. By enlarging the end openings into which fluid is to pass, passage into the fibres can be facilitated. Similarly, it has been found that there is significant difference in pressure drop values between an end opening defined by a hollow tube in plane at angle to the axis of the tube. This difference is attributed to an increased opportunity for fluid particles crowded about the opening to become orientated for essentially linear flow through the tube. The significance of this factor will clearly be dependent on the nature of the fluid and the size of bore of the tube. A hollow fibre having a bore of 200 $\mu$m diameter is only about ten times larger than leucocytes in blood and furthermore blood is a relatively viscous fluid so that an increase in fibre end openings in the fashion described can be of high significance.

Additionally, as will be apparent from the following description with reference to the accompanying drawings, hollow fibres having end openings defined by the fibres in a plane which is at acute angle to the axis of the fibres, can be incorporated into a large variety of hollow fibre constructions in which viscous fluid flow into fibres is not hampered as significantly as in known devices. Thus, particularly, directional changes of fluid flow can be significantly decreased as compared with known devices.

DETAILED DESCRIPTION OF THE INVENTION

Figure 1:
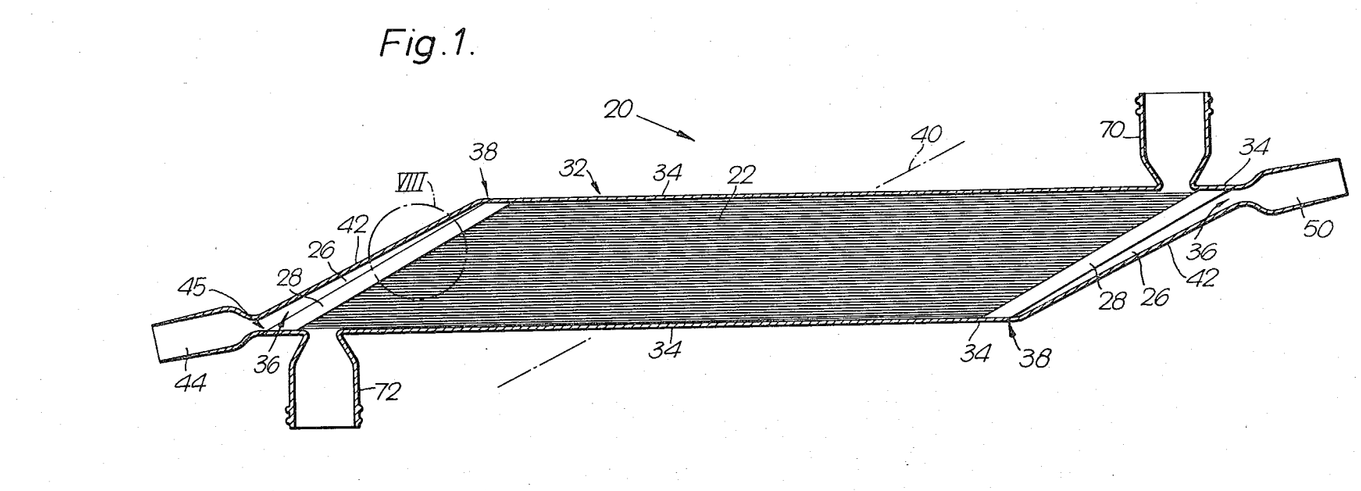
FIG. 1 shows a cross-section of a hollow fibre separatory device in a plane parallel to lengths of hollow fibre.

Referring to FIG. 1 of the drawings, reference numeral 20 refers in general to an exemplary hollow fibre separatory device in accordance with the invention. It is however to be appreciated that a large variety of devices can be devised which employ the concept of the invention. Particularly, hollow fibres may define enlarged openings of elliptical form by being associated in the form of a bundle and then cut at an acute angle relative to the axis of the fibres to define fibre end planes of varying form. Here illustrated are fibre end planes of rectangular and eliptical forms, but it is to be appreciated that fibre end planes such as of conical, circular, rhombic, double rectangular, and parabolic form may be devised.

In FIG. 1, the hollow fibre separatory device 20 comprises a plurality of hollow fibre lengths 22 having end openings 24 at each end thereof (see FIGS. 2, 3, 8 and 12). The end openings are eliptical and larger than the normal open cross-sectional area of the fibres by virtue of being defined in a plane at an acute angle relative to the axis of the fibres. For example, if the acute angle is 30°, the size of the end opening will be twice as large as the normal open cross-sectional area. The end openings 24 are situated in a fibre end plane 26, which fibre end plane is similarly at an acute angle relative to the axis of the hollow fibres. This acute angle is most conveniently the same as the acute angle at which fibres are cut but can be different.

Figure 2:
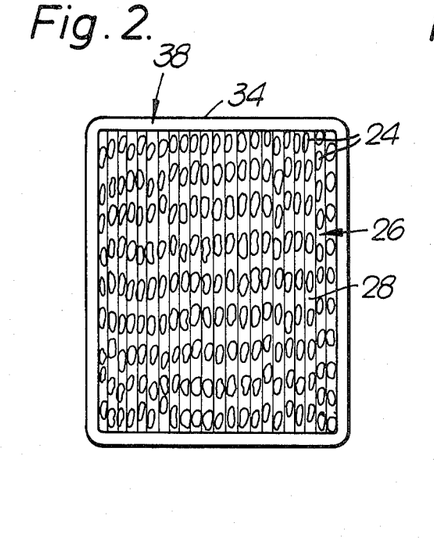
FIG. 2 shows a schematic presentation of elliptical hollow fibre end openings in a fibre end plane which is rectangular.
Figure 3:
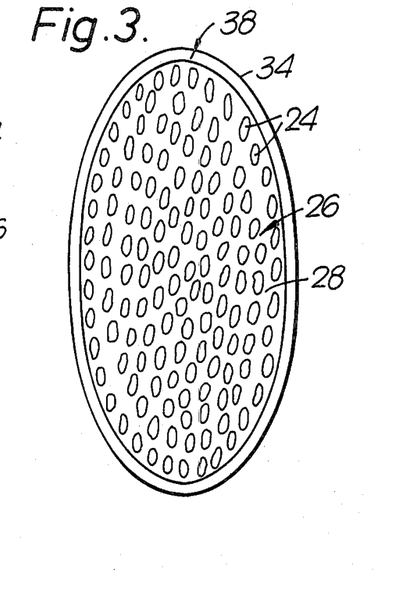
FIG. 3 shows a schematic presentation of elliptical hollow fibre end openings in a fibre end plane which is elliptical.

FIG. 2 shows a fibre end plane 26 of rectangular form and FIG. 3 shows a fibre end plane of eliptical form.

Figure 8:
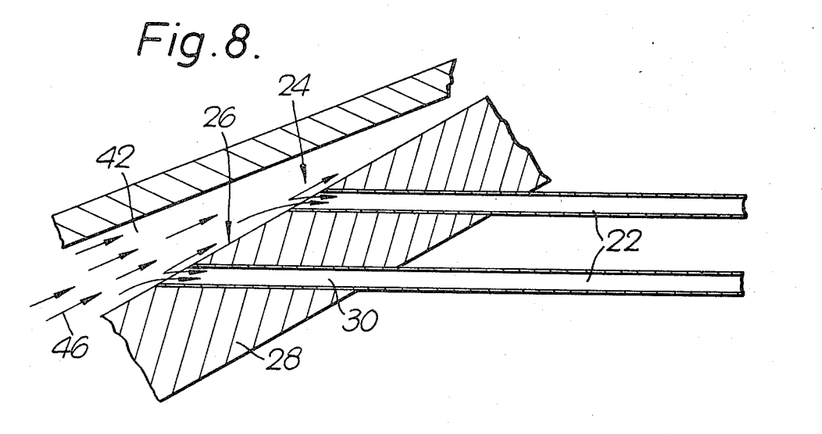
FIG. 8 shows a greatly enlarged section comprised within the circle VIII shown in FIG. 1.

Sealing means 28, such as of a solidified plastics material would in general also be situated in the fibre end plane, which sealing means would then provide a seal between the inside of the fibres 22 and the outsides of end sections 30 having the end openings 24 (refer to FIG. 8).

Referring back to FIG. 1, the hollow fibre device 20 comprises a casing referred to generally by reference numeral 32. The above-mentioned sealing means 28 can alone or in conjunction with further sealing material provide a seal between the casing section 34 and the outsides of end sections 30 of the fibres 22.

Figure 6:
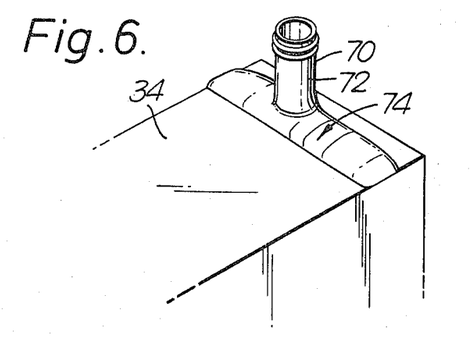
FIG. 6 shows a schematic presentation of an inlet or outlet for a fluid to flow about the outside of fibres assembled in a casing of rectangular cross-section.
Figure 7:
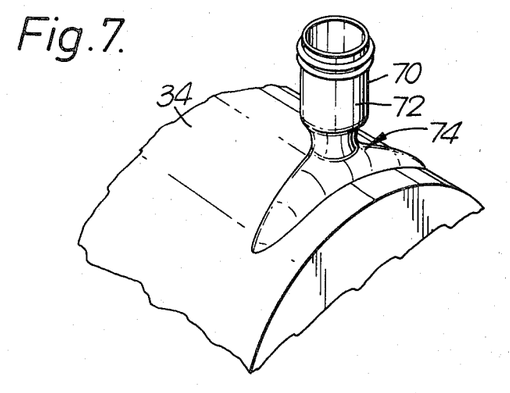
FIG. 7 shows a schematic presentation of an inlet or outlet for a fluid to flow about the outside of fibres assembled in a casing of circular cross-section.

It will be appreciated that in a construction in which end openings 24 are situated in a rectangular fibre end plane such as shown in FIG. 2, the casing would preferably also be of rectangular cross-section such as schematically shown in part in FIG. 6. In this case, the casing 32 would preferably define a reservoir 36 of rectangular cross-section similar to said fibre end plane. Similarly, where the end openings are situated in an eliptical fibre end plane such as shown in FIG. 3, the casing would preferably be of circular cross-section such as schematically shown in part in FIG. 7. In the latter case, the casing 34 would preferably define a reservoir 36 of eliptical cross-section similar to the eliptical fibre end plane 26.

As can be appreciated from FIG. 1 in combination with FIGS. 2 and 3, the casing section 34 is of hollow cylindrical form and defines annular sloped ends 38 sloped at an acute angle relative to the axis of end sections 30 of the fibres having the open ends 24.

As with the fibre end plane 26, the acute angle is preferably the same as the acute angle of the plane in which the fibre ends define eliptical end openings 24. Most preferably, and as shown in FIG. 1, the cylindrical casing section 34 defines sloped ends 38 at each end which are parallel to one another. In this construction, spin casting of settable cementitious material to form seals 28 can be carried out by spinning about the axis shown in dotted line in FIG. 1 and referred to by reference numeral 40. Casing end sections 42 defining the reservoir 36 in communication with hollow fibre end openings are shown secured to the sloped ends 38 and the seal 26 then is operable to provide a seal between the reservoir 36 and the outside of the fibres 22.

As can be seen from the cross-section shown in FIG. 1, and also from FIG. 8, the reservoir 36 defines a fluid flow passage leading across the end openings 24 of the fibres. An inlet 44 (at the left of FIG. 1 for example) opens into the reservoir at a peripheral region thereof (the reservoir for example being of rectangular or eliptical form). The casing end section 42 as related to the fibre end plane 26 is most preferably constructed so that the cross-sectional area of the flow passage defined by a flow plane across the general direction of fluid flow indicated by the arrow 46 in FIG. 8 progressively diminishes from a maximum at said peripheral region to a minimum at the opposing peripheral region (as can be seen by the converging form of the reservoir 36 in FIG. 1) dependently of the integrated cross-sectional open area defined by the hollow fibres rearwardly of said plane with respect to said fluid flow direction 46. In other words, the cross-sectional area of the reservoir 36 in a plane normal to the overall direction of fluid flow 46 diminishes dependently of the number of fibres traversed by fluid introduced into the reservoir 36 through inlet 44. It is of significance to note that the fluid flow direction 46 is essentially along the long axis of the eliptical openings.

Figure 4:
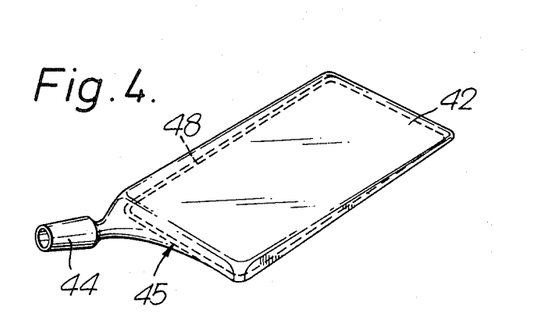
FIG. 4 shows an isometric view of a rectangular casing end section.
Figure 5:
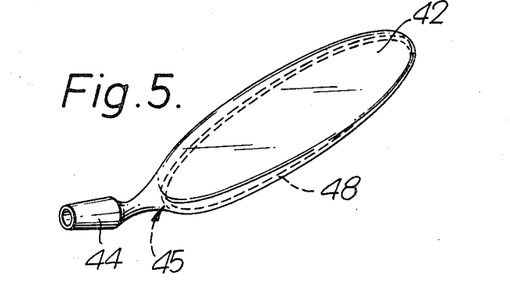
FIG. 5 shows an isometric view of an eliptical casing end section.

In a device in which the fibre end plane 26 is rectangular, the inlet 44 would preferably open into the reservoir transversely to a side of such rectangle and, in order to diminishes areas of potential stagnation, the fluid inlet opening 45 is preferably of elongated form and opens into the reservoir 36 along said side. This can be seen from the form of casing end section 42 shown in FIG. 4, which is provided with a seating surface 48 for seating and being sealingly secured to the sloped end 38 of a construction such as shown in FIG. 2. Similarly, where the fibre end plane 26 is circular or eliptical, the fluid inlet opening 45 is elongated and opens into the reservoir along a peripheral segment of the reservoir 36. This can be seen from the form of casing end section 42 shown in FIG. 5, which is provided with a seating surface 48 for seating and being sealingly secured to the sloped end 38 of a construction such as shown in FIG. 3.

At the right hand side of FIG. 1, an outlet 50 is provided and considerations similar to those described above in relation to the inlet 44 are preferably included.

The invention also includes processes for producing hollow fibre separatory devices such as described above. The one procedure has already been described, namely one in which fluid sealing material is spin cast into position by spinning by cylindrical casing section 34 with parallel sloped ends 38 about the axis 40 shown in FIG. 1. Details of this procedure are known in the literature, but the modification of spinning about an axis which is at an acute angle relative to the axes of fibres or the axis of the cylindrical casing section 34 with its parallel sloped ends is an important feature of a process in accordance with the present invention.

Consistently with the important feature of the embodiments of the hollow fibre separatory devices described above, a process step of importance involves the step of cutting of a hollow fibre 22 in a plane which is at an acute angle relative to the axis of the fibre to provide a fibre end opening which is larger than the cross-sectional area defined by the fibre in a plane normal to the axis of the fibre 22. Preferably, a seal 28 is provided to seal relatively short lengths of the outsides of the fibres together and then cutting the fibres by cutting through the seal at an acute angle relative to the axis of the fibres 22.

Figure 9:
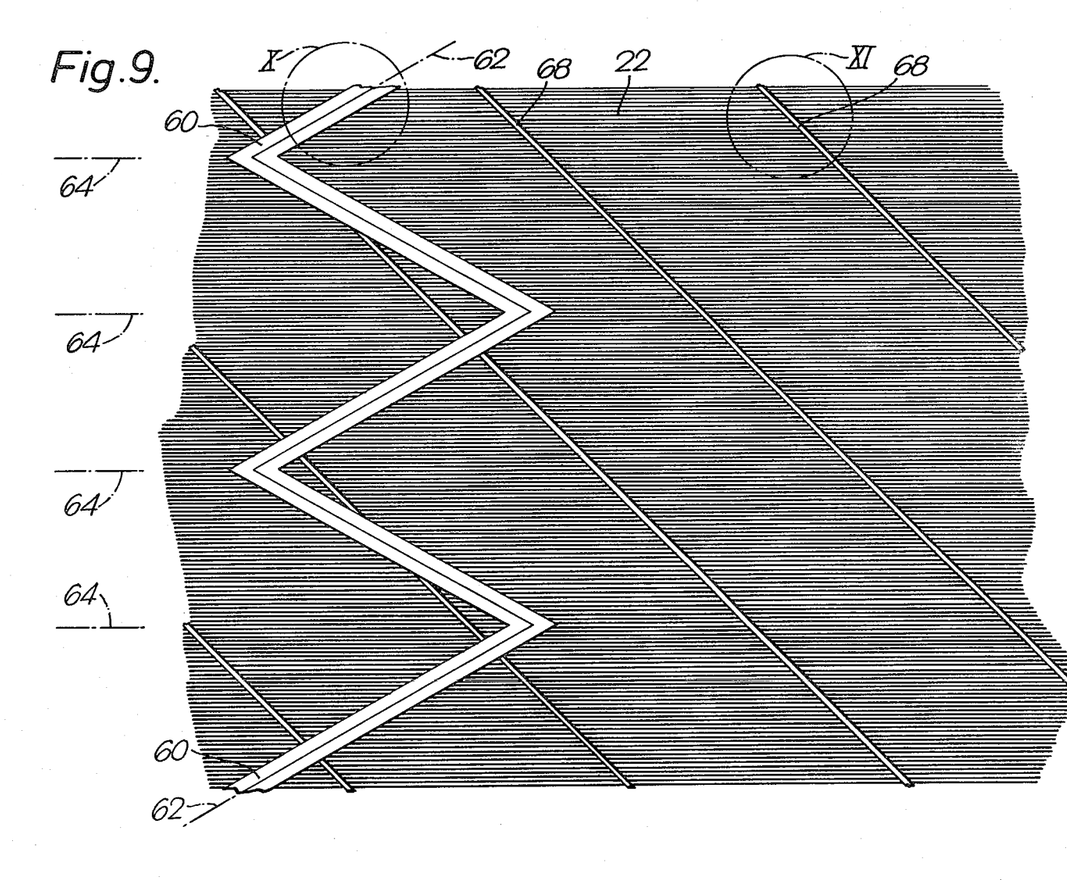
FIG. 9 shows a plurality of parallel hollow fibres arranged adjacent one another in the form a fibre sheet.

In one process of the invention, fibres are arranged in the form of a sheet such as shown in FIG. 9 and a seal 60 in the form of a band is provided across the sheet at an acute angle relative to the axis of the fibres along the line 62. As seen in FIG. 9, the seal may define a zig-zag configuration across the sheet of fibres. This configuration enables adjacent sections of the zig-zag to be aligned by folding about the points of the zig-zag referred to by the dotted lines 64 or alternatively producing discrete fibre sheet elements by cutting along said lines 64 and then stacking the elements so that a seal stack as shown in FIG. 2 is obtained. The seal stack, it will be appreciated is then at an acute angle relative to the axis of the fibres.

Preferably, the fibres are cut at an acute angle while still in the form of a sheet, assembled by folding or stacking and then cut again to provide a smooth fibre end plane 26.

Figures 10, 11, 12, 13:
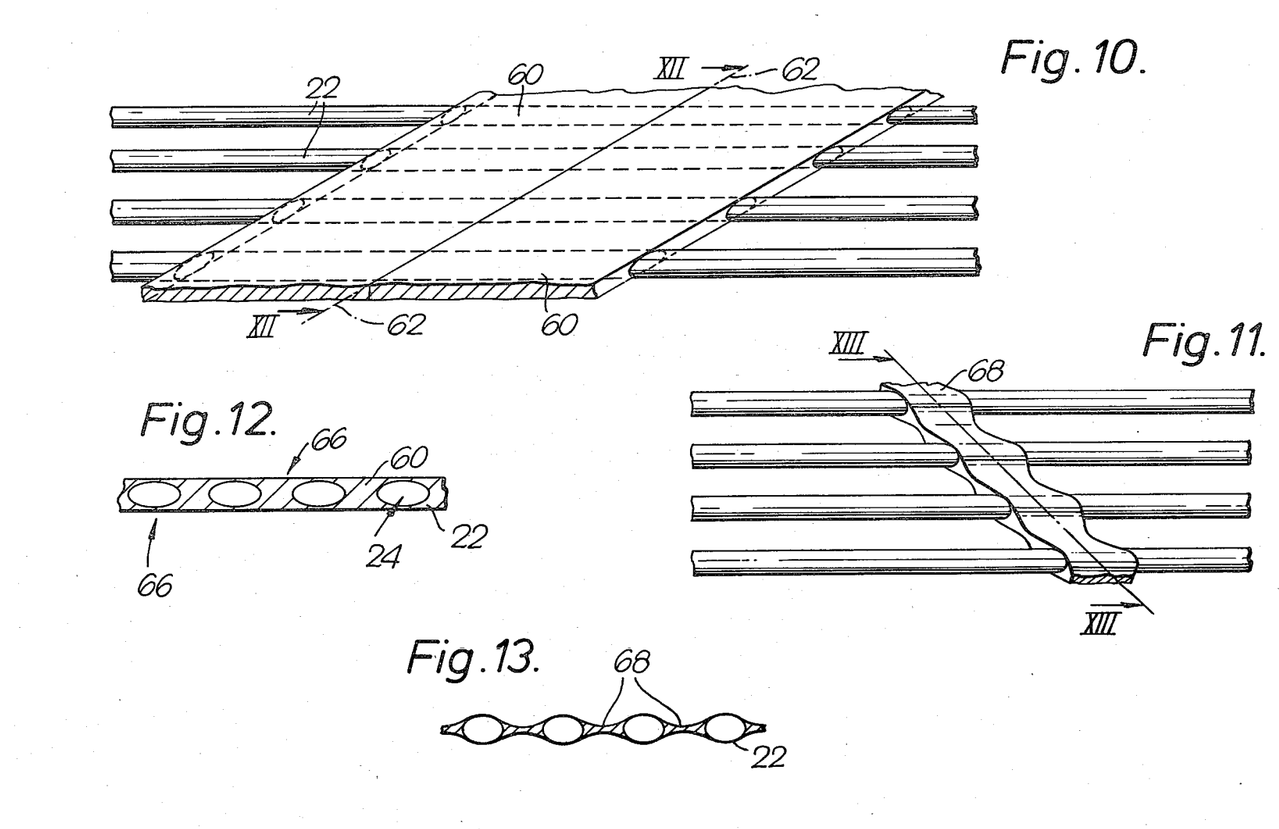
FIG. 10 shows a greatly enlarged section comprised within the circle X shown in FIG. 9.
FIG. 11 shows a greatly enlarged section comprised within the circle XI shown in FIG. 9.
FIG. 12 shows a section taken along the line XII—XII of FIG. 10.
FIG. 13 shows a section taken along the line XIII—XIII of FIG. 10.

The seal 60 in the form of a band, it will be seen from FIG. 12 defines sealing or seating surfaces 66. Conveniently, the band is of thermoplastic material whereby application of heat to the seal will cause adjacent band sections to fuse and seal together. However adjacent band sections may be sealed together (and to casing section 34) by various conventional means such as by glueing, or application of a small amount of solvent between adjacent surfaces.

In FIG. 9 and FIGS. 11 and 13, reference numeral 68 refers to fine threads of adhesive material securing adjacent fibres together. The threads, as shown in FIG. 9 are also at an acute angle relative to the axis of the fibres. This enables folding or rolling of a sheet of fibres so that adhesive material is distributed along the length of the resulting fibre stack or bundle.

It is to be appreciated that other techniques, such as by dipping fibre ends into a viscous mass of sealing material can also be employed to establish the seal 28 in hollow fibre separatory devices in accordance with the present invention.

In FIG. 1, reference numeral 70 refers to a fluid inlet and reference numeral 72 refers to a fluid outlet for passage of a fluid about the outsides of the fibres 22. Such fluid, such as dialysis liquid for hollow fibre separatory devices to be employed as a blood dialyser are conveniently in the form shown in FIGS. 6 and 7 respectively showing rectangular and circular cross-section cylindrical casing sections 34. In a fashion similar to the inlet and outlet 44 and 50 the opening 74 opens along the length or along a segment of the casing section 34 to achieve fluid distribution. It is however to be appreciated that only an outlet such as outlet 72 would be required for a hollow fibre separatory device to be employed as a filter. The reverse situation is similarly included, namely where fluid to be treated is passed into inlet 70 and treated fluid withdrawn from outlet 72. Where such device is contemplated and filtering is intended, only an outlet 50 would be required, for example in a haemofiltration techinique. As already As already noted above it is of significance that the fluid flow direction 46 is essentialy parallel to the long axes of the eliptical end openings 24. This is of particular significance where the fluid is viscous and of even greater significance where the fluid is blood. Thus, as can be observed from FIG. 8, the eliptical fibre end opening 24, situated in a sloped fibre end plane 26 nearly parallel to the fluid flow direction 46 enables fluid to flow into the fibres with directional changes which in general would not exceed the acute angle at which the fibre end plane 26 is sloped. This is in contrast to known devices in which fluid spreads from a centrally located inlet into a reservoir of circular section normal to the fibre ends and then into fibre end openings of normal cross-sectional area. In such devices directional changes would in general be at right angles.

It is observed from FIG. 8 that the uppermost sides of the eliptical openings 24 define a sharp dividing edge for dividing flow of fluid into fibres from flow of fluid further along the reservoir 36. The sharp dividing edge is considered to present low potential for stasis, and in similar fashion, by virtue of flow being "smoothened" in general to deviate only by an amount corresponding to the acute angle, the lower sides of the eliptical openings are also considered to present low potential for stasis. Reference is made to FIG. 8 in this regard.

As already mentioned, priming of hollow fibre devices with physiological saline solution can also be facilitated and the larger openings may enable fibres of smaller cross-section to be employed.

What we claim is:

1. A hollow fibre separatory device comprising a plurality of hollow fibres having end openings defined at ends of the hollow fibres, which end openings are larger than the open cross-sectional area defined by the fibres inwardly of said ends in a plane normal to the axes of the fibres, the open ends of the hollow fibres being situated in a plane which is at an acute angle relative to the axes of end sections of the fibres, and in which a reservoir is provided which defines a fluid flow passage leading across the open ends of the fibres from a region adjacent the acute angle defined at the periphery of the plane defined by open fibre ends to the opposing peripheral region thereof.

2. A hollow fibre separatory device according to claim 1, in which end openings are from 1.1 to 6 times larger than said open cross-sectional area.

3. A hollow fibre separatory device according to claim 2, in which the end openings are from 1.5 to 3 times larger than said open cross-sectional area.

4. A hollow fibre separatory device according to claim 1, in which the end openings are eliptical.

5. A hollow fibre separatory device according to claim 4, in which the eliptical end openings are defined by ends of hollow fibres in a plane which is at an acute angle relative to the axes of hollow fibre end sections having the end openings.

6. A hollow fibre separatory device according to claim 5, in which the acute angle is from 10° to 60°.

7. A hollow fibre separatory device according to claim 6, in which the acute angle is from 15° to 45°.

8. A hollow fibre separatory device according to claim 7, in which the acute angle is 30°.

9. A hollow fibre separatory device according to claim 5, in which the end openings are situated in a fibre end plane.

10. A hollow fibre separatory device according to claim 9, in which the fibre end plane is substantially rectangular.

11. A hollow fibre separatory device, according to claim 9, in which the fibre end plane is substantially eliptical.

12. A hollow fibre separatory device according to claim 9, in which the fibre end plane is at an acute angle relative to the axis of hollow fibre end sections having the end openings.

13. A hollow fibre separatory device according to claim 12, in which the acute angle of the fibre end plane is the same acute angle as the acute angle of a plane relative to the axes of hollow fibre end sections at which plane hollow fibre ends define eliptical end openings.

14. A hollow fibre sepoartory device according to claim 13, in which the end openings are situated in an eliptical fibre end plane and in which the casing is of circular cross-section inwardly of said fibre end plane.

15. A hollow fibre separatory device according to claim 14, in which the casing defines a reservoir in fluid communication with the end openings, the reservoir having an eliptical cross-section similar to the eliptical fibre end plane.

16. A hollow fibre separatory device according to claim 15, in which the reservoir is of a substantially eliptical cross-section similar to said eliptical plane and in which the fluid inlet opens into the reservoir in a direction essentially along the long axis of said eliptical plane.

17. A hollow fibre separatory device according to claim 16, in which the fluid inlet opening is elongated and opens into the reservoir along a peripheral segment of the eliptical reservoir.

18. A hollow fibre separatory device according to claim 1, in which sealing means sealing together outside end sections of the hollow fibres is provided.

19. A hollow fibre separatory device according to claim 18, comprising a casing encasing the plurality of hollow fibres, and sealing means providing a seal between the casing and said outside of end sections of the fibres.

20. A hollow fibre separatory device according to claim 19, in which the end openings are situated in a rectangular fibre end plane and in which the casing is of rectangular cross-section.

21. A hollow fibre separatory device according to claim 20, in which the casing defines a reservoir in fluid communication with the end openings, the reservoir having a rectangular cross-section similar to said rectangular fibre end plane.

22. A hollow fibre separatory device according to claim 20, in which the reservoir is of a substantially rectangular cross-section similar to said rectangular plane, and in which the fluid inlet opens into the reservoir transversely to a side of such rectangle.

23. A hollow fibre separatory device according to claim 22, in which the fluid inlet opening is of elongated form and opens into the reservoir along said side.

24. A hollow fibre separatory device according to claim 19, in which the casing comprises a casing section of hollow cylindrical form, which casing section defines an annular sloped end sloped at an acute angle relative to the axis of end sections of the fibres having the open ends.

25. A hollow fibre separatory device according to claim 24, in which the acute angle of the sloped end is the same acute angle as the acute angle of a plane relative to the axes of hollow fibre end sections at which plane hollow fibre ends define eliptical end openings.

26. A hollow fibre separatory device according to claim 24, in which the cylindrical casing section defines a sloped end at each end of the hollow cylindrical form.

27. A hollow fibre separatory device according to claim 26, in which the sloped end at one end of the hollow cylindrical form is parallel to the sloped end at the other end thereof.

28. A hollow fibre separatory device according to claim 24, in which a casing end section defining a reservoir in communication with a hollow fibre end openings is secured to the sloped end, a seal then being provided between the reservoir and the outside of the fibres.

29. A process for producing a hollow fibre separatory device comprising the steps of assembling a plurality of hollow fibres, cutting the hollow fibres in a plane which is at an acute angle relative to the axes of end sections of the fibres to provide fibre end openings which are larger than the cross-sectional area defined by the fibres in a plane normal to the axes of the fibres and providing a fluid flow passage which leads across the open ends of the fibres from a region adjacent the acute angle defined at the periphery of the plane defined by open fibre ends to the opposing peripheral region thereof.

30. A process according to claim 29, in which a seal is provided to seal relatively short lengths of the outsides of the fibres together, and in which the fibres are cut by cutting through the seal at an acute angle relative to the axes of the fibres.

31. A process according to claim 30, in which the fibres are arranged in the form of a sheet and in which the seal is provided across the sheet at an acute angle relative to the axis of the fibres.

32. A process according to claim 31, in which the fibre sheet is assembled into the form of a stack so that adjacent sections of the zig-zag align together to define a seal stack at an acute angle relative to the axes of the fibres.

33. A process according to claim 32, in which the fibres are cut again by cutting through the seal stack.

34. A process according to claim 33, in which a plurality of fibres lengths are assembled in a hollow cylindrical casing section and in which the seal is provided by introducing a solidifiable sealing material between the outsides of the fibres and the inside of end sections of the hollow cylindrical casing section.

35. A process according to claim 34, in which the cylindrical casing section has a sloped end sloped at an acute angle relative to the axes of end sections of the lengths of hollow fibres, and in which the centrifugal force is applied by rotating the casing, lengths of hollow fibre and solidifiable sealing material about an axis which is substantially parallel to said sloped end.

36. A process according to claim 30, in which the seal defines a zig-zag configuration across the sheet.

37. A process according to claim 36, in which the fibres are cut by cutting through the seal before assembling of the fibre sheet into the form of a stack.

38. A process according to claim 37, in which the fibres are cut by cutting through the seal stack.

39. A process according to claim 38, in which the fluid solidifiable sealing material is introduced by the application of a centrifugal force to the fluid sealing material.

* * * * *